United States Patent
Monk

(10) Patent No.: US 11,709,285 B1
(45) Date of Patent: Jul. 25, 2023

(54) METHOD FOR LOCATING SEISMIC ENERGY SOURCES FOR SUBSURFACE SURVEYING

(71) Applicant: ACTeQ LLC, Katy, TX (US)

(72) Inventor: David Monk, Houston, TX (US)

(73) Assignee: ACTeQ LLC, Katy, TX (US)

( * ) Notice: Subject to any disclaimer, the term of this patent is extended or adjusted under 35 U.S.C. 154(b) by 0 days.

(21) Appl. No.: 17/689,687

(22) Filed: Mar. 8, 2022

(51) Int. Cl.
*G01V 1/02* (2006.01)
*G01V 1/16* (2006.01)

(52) U.S. Cl.
CPC ............... *G01V 1/02* (2013.01); *G01V 1/168* (2013.01); *G01V 2210/121* (2013.01); *G01V 2210/1295* (2013.01)

(58) Field of Classification Search
CPC .... G01V 1/02; G01V 1/168; G01V 2210/121; G01V 2210/1295
See application file for complete search history.

(56) References Cited

U.S. PATENT DOCUMENTS

| | | | |
|---|---|---|---|
| 5,627,798 | A | 5/1997 | Siems et al. |
| 6,882,938 | B2 | 4/2005 | Vaage et al. |
| 8,238,197 | B2 | 8/2012 | Crice et al. |
| 8,711,654 | B2 * | 4/2014 | Moldoveanu ........ G01V 1/3808 367/131 |
| 10,054,700 | B2 | 8/2018 | Degner et al. |
| 11,221,426 | B2 | 1/2022 | Kumar et al. |
| 2011/0305113 | A1 * | 12/2011 | Eick ........................ G01V 1/20 367/56 |
| 2014/0372044 | A1 * | 12/2014 | Jiao ........................ G01V 1/282 702/16 |

(Continued)

OTHER PUBLICATIONS

Huang et al., "Compressive Sensing Aided Seismic Geometry Design for Offshore Acquisition", Acta Geophysica, vol. 70, pp. 547-562 (2022) (Year: 2022).*

(Continued)

*Primary Examiner* — Yuqing Xiao
*Assistant Examiner* — Christopher Richard Walker
(74) *Attorney, Agent, or Firm* — Richard A. Fagin

(57) ABSTRACT

A method for seismic surveying includes deploying a first seismic energy source at a plurality of locations along a source line. Locations are determined by, (i) setting a shot point at one end of the line, setting a minimum distance between shot points and setting a nominal shot point interval being greater than a Nyquist maximum spacing at a maximum spatial frequency to be evaluated in the subsurface area, (ii) calculating a maximum distance between shot points as a difference between twice the nominal shot point interval and the minimum distance, (iii) dividing a span between the maximum distance and the minimum distance into equally spaced samples, and choosing at random one of the equally spaced samples to calculate a shot point subsequent to the initial shot point; and (iv) setting the calculated shot point as the initial shot point and repeating (ii) and (iii) until the subsequent calculated shot point is within a predetermined distance of an opposed end of the first source line. Seismic receivers are deployed at proximate the subsurface area. The seismic energy source is actuated. Seismic signals are detected in response to energy imparted by the first seismic energy source by the receivers.

14 Claims, 2 Drawing Sheets

(56) References Cited

U.S. PATENT DOCUMENTS

2015/0117149 A1* 4/2015 Edme ................ G01V 1/32
  367/37
2016/0320506 A1* 11/2016 Almuhaidib .......... G01V 1/364

OTHER PUBLICATIONS

Anna Titova et al, "Two-stage sampling—A novel approach for compressive sensing seismic acquisition", First International Meeting for Applied Geoscience & Energy, Society of Exploration Geophysicists, 2021.

Nicholas Tellier et al, "Mastering the highest Vibroseis productivity while preserving seismic data quality", First Break, vol. 40, Jan. 2022.

T Manning et al., "Could You Use One Million Nimble Node Channels?", 81st EAGE Conference & Exhibition 2019 Jun. 3-6, 2019, London, GB.

* cited by examiner

METHOD FOR LOCATING SEISMIC ENERGY SOURCES FOR SUBSURFACE SURVEYING

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic surveying of the Earth's subsurface. More particularly the disclosure relates to methods for locating seismic energy sources to illuminate the subsurface for seismic investigation.

Seismic surveying known in the art is performed by placing one or more seismic energy sources (e.g., explosives, vibrators, hammers) at selected locations on the Earth's surface or in a body of water. Seismic sensors, detectors or receivers (used interchangeably herein) are disposed at selected locations on the earth's surface, below the surface, in the water or on the water bottom. The seismic energy sources are actuated at selected times to impart seismic energy into the subsurface. Seismic energy returned from the subsurface as a result of interaction between the imparted energy and features in the subsurface is detected by the receivers. Inferences about the structure, mineral composition and fluid content of the subsurface may be made by various processes performed on the signals generated by the receivers. In order to make such inferences and spatially locate identified features correctly within the subsurface, it is desirable to place the sources and receivers at known locations and with sufficiently small spacing between adjacent sources and receivers to be able to correctly identify features of a particular lower size limit. The spacing between adjacent sources and receivers using seismic surveying methods known in the art is frequently uniform and regular. Using surveying methods known in the art, spacing between sources and receivers affect the resolution of the seismic survey because each source and receiver location is in effect a point sample of seismic response to the features in the subsurface. It is necessary, using conventional surveying techniques to have a sufficient density of samples to correctly represent the features in the subsurface. Features smaller than can be effectively sampled for any specific source or receiver spacing may be spatially aliased, and therefor incorrectly represented in the detected seismic signals. The Nyquist sampling criterion is that at least two samples per cycle be measured, or one half wavelength at the highest frequency must be sampled when the samples are equally spaced apart in the dimension of the sampling. The Nyquist-criterion sampling distance ("Nyquist maximum spacing") is at most one half wavelength of features in the subsurface to be spatially sampled. Expressed as its inverse, Nyquist sampling requires at least two samples at the highest spatial frequency of features to be evaluated in the subsurface.

Optimal selection of locations for sources and receivers in a seismic survey has been a long-standing concern for geophysicists. If it is possible to place the sources and/or receivers at a spacing among them of no more than two points per wavelength of the imparted seismic energy, or preferably more closely in all dimensions, according to Nyquist sampling theory as explained above, then the specific source and receiver locations (referred to as a survey "design") designated for a particular survey generally to not affect the quality of the seismic data so obtained. Undersampling in the space domain, as explained above, may result in spatial aliasing of the survey results, in that features smaller than those deemed by Nyquist sampling theory to be determinable may be misrepresented in interpreted surveys. Practical considerations of limited access to certain locations on the surface and the costs of conducting surveys, among others, often limit the possible placement locations and spacing of the sources and receivers. Such limitations may result in the as-designed survey spacing providing orders of magnitude fewer locations ("sampling points") than Nyquist theory indicates are needed to correctly survey the subsurface.

Seismic surveying, in particular land seismic surveying, is typically conducted as a series of "lines", where lines of seismic source locations ("shot points") are arranged, and seismic sources are activated at selected times at the designated shot points along these lines. Seismic receivers are similarly arranged along lines, and are typically positioned at regular intervals (uniform or equal spacing) along these lines. The receiver lines may be parallel, perpendicular or arranged at some angle with respect to the source lines.

Regular or uniform spacing for the sources and receivers facilitates operation during the acquisition of seismic data, and in the case of the seismic receivers, which may be interconnected with cables, the distances between adjacent receivers are generally constrained to be regular, which leads to optimum practical deployment being along regular lines.

Compressive sensing (CS) is a theory for non-uniform (random) spatial sampling that allows the use of significantly fewer sampling points than is the ordinary practice in seismic exploration. Such capability is believed to be made possible by randomizing the locations of the sources and/or receivers in a seismic survey. In CS techniques known in the art, the randomization of sparse sample locations (spacing between locations being relatively large) is applied to the seismic receivers. The foregoing may be practical for use with autonomous or wirelessly connected seismic receivers, but for seismic receivers connected with cables, as is still common, implementing random receiver locations may be impractical. While reducing the number of seismic receivers can have a significant impact on the cost of conducting a land-based seismic survey when using autonomous or wireless receivers, a reduction, rather, in the number of source points can significantly reduce the time and operational cost of a seismic survey even when used withy cable-connected receivers.

Irregular deployment of receivers is more practical with the use of autonomous seismic detectors, often referred to as "nodes", and the concept of deploying irregularly located receivers for CS applications is discussed in various papers and patents set forth elsewhere in this disclosure. However, setting out randomly located receivers (particularly when they are located randomly in 2 directions) makes deployment far more difficult than when deploying with regular spacing along regular lines for several reasons. Survey personnel cannot walk in a straight line and place randomly spaced receivers along such lines. This results in much slower deployment and retrieval operations. Additionally, actual tracking of the random positions of autonomous or wireless receivers placed randomly has proven difficult. As a result, some receivers may be difficult or impossible to locate for retrieval after the survey, and on occasion two receivers may be placed at the same (or close) locations, as the first placed receiver may not be easily observed when the subsequent receiver was to be located.

Still further, when seismic survey crews only had to deploy a few thousand receivers to conduct a survey, there was a clear benefit to being able to obtain the same spatial bandwidth of data by using random receiver deployments and a relatively small number of receivers as contrasted with using much greater numbers of receivers deployed at uniform spacing. It is more recently the case that seismic survey crews may be required to deploy tens of thousands, hundreds of thousands or even (as suggested in T. Manning, J. Stonel, A. Ourabahl, D. Ablyazina, J. Quigley, *Could You Use One Million Nimble Node Channels?*, transactions of the 81st EAGE Conference & Exhibition, 3-6 Jun. 2019, London) perhaps as many as one million seismic receivers. With very large numbers of receivers, random deployment has proven to be unnecessary; it is entirely feasible to spatially sample the subsurface using regular receiver spacing at small distances between receivers (fine intervals). In addition, seismic receiver nodes or wireless receivers can be deployed more rapidly, using automated equipment in some cases (see, e.g., U.S. Pat. No. 10,845,492 issued to Degner et al.) when they are regularly spaced. Deploying node type or wireless seismic receivers in a random pattern would slow the deployment.

More recently there has been considerable interest in the deployment of seismic sources at positions, in addition to receiver positions, on an irregular or random basis to take advantage of CS technology, which allows reconstruction of seismic data from irregularly spaced samples in a way that overcomes spatial frequency limitations associated with regular sampling of seismic data. Some such methods as applied to receiver locations include the following. The irregularity is typically provided by either random removal of points on a fine grid, or by random movement ("dithering") of points on a regular grid. Both of these methods have intrinsic limitations.

In the case of random removal of points from a finely spaced point grid, there are two inherent limitations with such technique. The first is that the final location points still fit on a regularly spaced grid. Such spacing regularity limits the wavenumbers than can be recovered from the seismic data to that which would be obtained with the underlying, regularly spaced grid. If the grid is the same spacing as would be used with regular sampling, then it is not possible recover data beyond what would be obtained with the regularly spaced receivers. The second issue is that if the location points are genuinely selected in a random fashion, then it is possible to introduce large gaps in the spacing in some places in either source or detector locations. Very large gaps may lead to an inability to reconstruct data in the region of the gap as the subsurface has simply not been adequately spatially sampled. A two-stage approach to solving the problem has been proposed (see, A Titova, M. B. Wakin and A. Tura, 2021, *Two-stage sampling—A novel approach for compressive sensing seismic acquisition*, Proceedings of the First International Meeting for Applied Geoscience & Energy P 110-114), where large gaps resulting from the first random selection of points are subsequently back filled with a second stage random selection of points within the initial big gaps.

A method that includes dithering of receiver points previously established on a regular grid overcomes the problem of introduction of large gaps, but leads to a situation where it is impossible to have more than two points closely spaced. Close spacing occurs when two points are dithered towards each other from a regular grid.

There is a continued need for methods of deploying seismic sources at larger spacing to improve the efficiency of seismic surveying, particularly in land-based seismic surveys.

SUMMARY

One aspect of the present disclosure is a method for seismic surveying a subsurface area. A method according to this aspect includes deploying a first seismic energy source at a plurality of locations along a first source line proximate the subsurface area. The plurality of locations is determined by, (i) setting an initial shot point at one end of the first source line, setting a minimum distance between shot points and setting a nominal shot point interval being greater than a Nyquist maximum spacing at a maximum spatial frequency to be evaluated in the subsurface area, (ii) calculating a maximum distance between shot points as a difference between twice the nominal shot point interval and the minimum distance, (iii) dividing a span between the maximum distance and the minimum distance into a selected number of equally spaced samples, and choosing at random one of the equally spaced samples to calculate a shot point subsequent to the initial shot point; and (iv) setting the calculated shot point as the initial shot point and repeating (ii) and (iii) until the subsequent calculated shot point is within a predetermined distance of an opposed end of the first source line. A plurality of seismic receivers is deployed at selected receiver positions proximate the subsurface area. At selected times, the seismic energy source is actuated. Seismic signals are detected in response to energy imparted into the subsurface area by the first seismic energy source using the plurality of receivers.

In some embodiments, the first source line is separated into at least a first segment and a second segment interrupted by an obstruction along the first source line. The plurality of locations on the second segment are determined by (v) setting an initial shot point at one end of the second segment, setting a minimum distance between shot points and setting a nominal shot point interval being greater than a Nyquist maximum spacing at a maximum spatial frequency to be evaluated in the subsurface area, (vi) calculating a maximum distance between shot points as a difference between twice the nominal shot point interval and the minimum distance, (vii) dividing a span between the maximum distance and the minimum distance into a selected number of equally spaced samples, and choosing at random one of the equally spaced samples to calculate a shot point subsequent to the initial shot point; and (viii) setting the calculated shot point as the initial shot point and repeating (vi) and (vii) until the subsequent calculated shot point is within a predetermined distance of an opposed end of the second segment.

In some embodiments, the selected receiver positions are disposed along at least one receiver line.

In some embodiments, the plurality of seismic receivers comprise nodal sensors connected wirelessly to a recording system.

Some embodiments further comprise deploying a second seismic energy source at a plurality of locations along a second source line proximate the first source line, the plurality of locations along the second line determined by, (ix) setting an initial shot point at one end of the second source line, setting a minimum distance between shot points and setting a nominal shot point interval being greater than a Nyquist maximum spacing at a maximum spatial frequency to be evaluated in the subsurface area, (x) calculating a maximum distance between shot points as a difference between twice the nominal shot point interval and the minimum distance, (xi) dividing a span between the maximum distance and the minimum distance into a selected number of equally spaced samples, and choosing at random one of the equally spaced samples to calculate a shot point subsequent to the initial shot point; and (xii) setting the calculated shot point as the initial shot point and repeating (xi) and (xii) until the subsequent calculated shot point is within a predetermined distance of an opposed end of the second source line. The second seismic energy source is actuated. Seismic signals are detected in response to energy imparted into the subsurface area by the second seismic energy source using the plurality of receivers.

In some embodiments, the first seismic energy source and the second seismic energy source are operated such that the detected seismic signals comprise energy from the first seismic energy source and the second seismic energy source.

Some embodiments further comprise deblending the detected seismic signals into records comprising energy from only one of the first seismic energy source or the second seismic energy source.

In some embodiments, the selected receiver positions are disposed along at least one receiver line.

In some embodiments, the at least one receiver line is parallel to the first source line, and the second source line is parallel to the first source line.

In some embodiments, the at least one receiver line is perpendicular to the first source line, and the second source line is parallel to the first source line.

In some embodiments, the first seismic energy source comprises a seismic vibrator.

In some embodiments, the nominal shot point interval is at least twice a value of one half wavelength at the highest spatial frequency.

In some embodiments, the nominal shot point interval is between two and four times the value of one half wavelength at the highest spatial frequency.

Other aspects and possible advantages will be apparent from the description and claims that follow.

DETAILED DESCRIPTION

Figure 1:
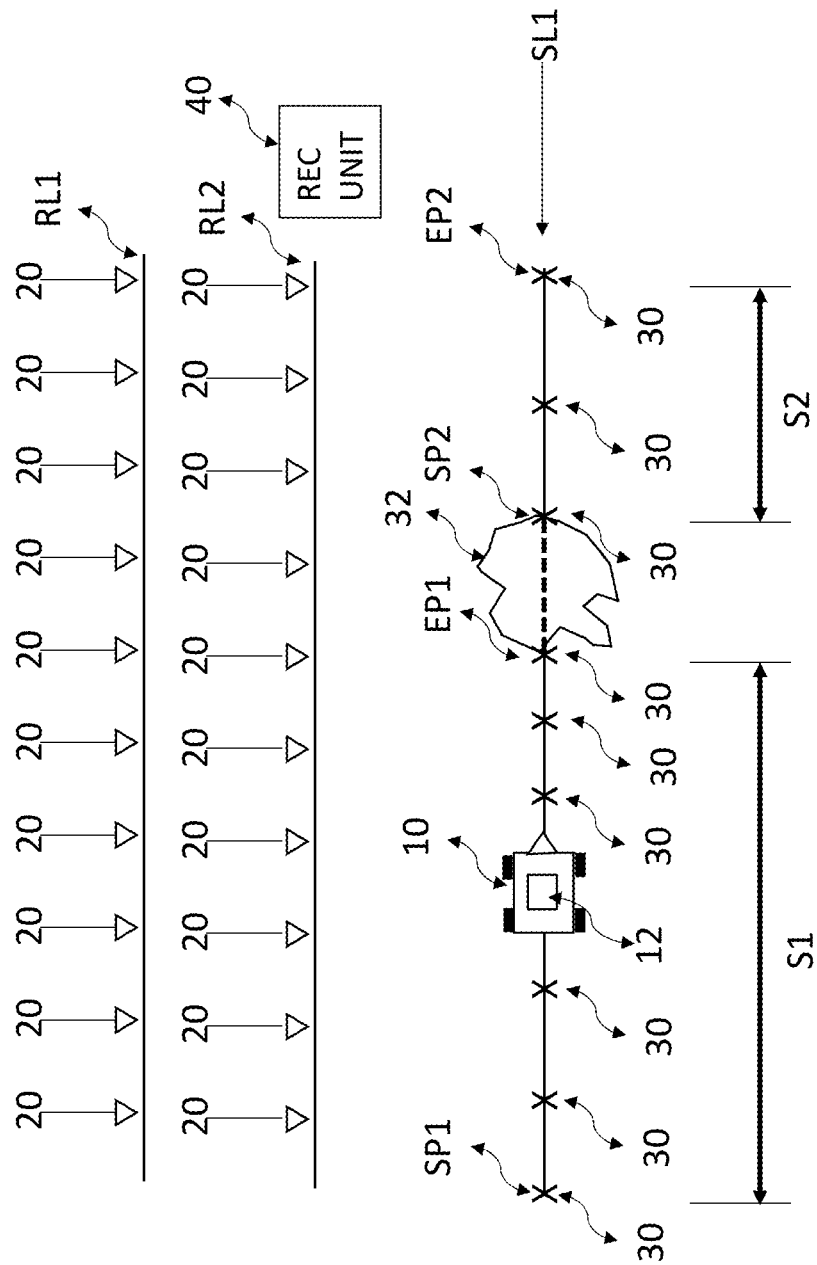
FIG. 1 shows a plan schematic view of an arrangement of a seismic energy source and seismic receivers that may be used in some embodiments.

A method according to the present disclosure acquires seismic data by randomizing locations of one or more seismic energy sources (such locations being referred to as "shot points") during seismic signal acquisition. The shot points may be located along a line or along multiple parallel lines. The method of randomization described herein may address limitations of other compressive sensing methods described in the Background section herein. A method according to the present disclosure allows randomization that makes possible having several (or many) shot points being close together, but avoids the introduction of excessively large gaps between sequential shot points.

In order that methods according to the present disclosure are generally applicable to most types of land-based seismic surveys, in some embodiments only the shot points are randomized. In some embodiments the receiver locations may be regularly spaced, such as on a line or on a grid of parallel lines. In some embodiments, seismic acquisition may be performed with receivers which are connected by cables. Cable-connected receivers are ordinarily deployed at regularly spaced intervals. See, e.g., U.S. Pat. No. 5,627,798 issued to Siems et al. Regularized receiver locations reduces complexity in the design and operation of seismic surveys that would otherwise result from deploying receivers at random locations. In addition, it is understood that land-based seismic surveys often take place in areas where parts of any particular seismic source line cannot be accessed by a seismic source (typically vibrators, explosives or accelerated weight drop impulsive sources). The randomization method described herein takes account of such access limitations and minimizes the size of any gap between shot points associated with an obstruction.

A possible secondary benefit accrues to randomization of shot points along a line or along multiple parallel lines, when used with regularly spaced receiver points. Many seismic surveys include signal acquisition from multiple seismic energy sources operating contemporaneously, or in at least partially overlapping times where energy from more than one source may be present in signals detected by one or more receivers. The overlapping source energy is "deblended" as part of subsequent processing such that energy originating from only one source may be identified each of the receiver signals. See, e.g., U.S. Pat. No. 11,221, 426 issued to Kumar et al. The deblending process requires the source activation times to be random with respect to each other. While it is unlikely that two or more sets of sources (e.g., vibrator units), would acquire data with exactly the same time interval between shot points while the sources travel along different source lines, if the shot points are regularly spaced apart such occurrence becomes more likely. The foregoing problem is illustrated Tellier et al, 2022, cited in the Background section herein. By making the distance between shot points along a line vary from shot point to shot point, the shot points would not have similar intra-shot time intervals. As a result, the quality of the seismic data obtained may be improved by having the receivers disposed at regularly spaced locations. A combination of random shot points and random receiver locations can make deblending seismic signal recordings far more difficult because the target deblended seismic signals, that is signals attributable to only one source, may not be coherent in any domain. By retaining a regular interval between receiver locations, the ability to deblend seismic signals from blended source operation is maintained.

There may also be benefits to maintaining "lines" of shots and receivers in a three dimensional seismic survey. Operationally, a seismic survey with regularized receiver locations is far easier to plan and work in the field. Seismic recording systems connected with cables make random distribution of receivers difficult along receiver line(s), and even more difficult to deploy with randomization away from a line. For vehicle mounted sources, it is substantially easier for operators to navigate along a continuous line rather than move in a random pattern between shot points, and in areas which need to be cleared of trees, mines or other obstructions, continuous lines are far easier to operate. Varying the source locations along any particular line is, however, relatively easy for the vehicle operator once the line is established.

FIG. 1 shows a plan view of an example arrangement of an arrangement of one or more seismic energy sources and seismic receivers that may be used to acquire seismic data above an area of the subsurface in accordance with the present disclosure. One or more seismic energy sources 10, which in the present example embodiment may be vehicle mounted, such as a vibrator truck or weight drop truck, the actuation mass for which is shown at 12 may navigate along one or more source lines, one of which is shown at SL1, on the ground surface. Seismic receivers 20 may be arranged along one or more receiver lines RL1, RL2. The receiver lines RL1, RL2 may be parallel to each other and parallel to the one or more source lines SL1. In some embodiments, the seismic receivers 20 may be equally spaced apart along the respective receiver lines RL1, RL2. The seismic receivers 20 may be connected by cable(s) to a data recording system 40 for recording signals generated by each of the seismic sensors 20, or, as in the present embodiment, the seismic receivers 20 may be "node" type, having self-contained electrical power and signal processing devices (not shown separately) for recording and/or transmitting detected signals to the recording system 40. A non-limiting example of such node type seismic receivers is described in U.S. Pat. No. 10,054,700 issued to Degner et al. Other types of seismic sensors may communicate wirelessly to a signal collection point or recording system. See, e.g., U.S. Pat. No. 8,238,197 issued to Crice et al.

The seismic energy source 10, if vehicle mounted, may move to predetermined shot points 30 located along the source line(s) SL1. At each shot point 30, the seismic energy source 10 is actuated to impart seismic energy into the subsurface below the survey area, and the seismic receivers 20 detect, transmit and/or record signals induced in response to the imparted seismic energy. The vehicle mounted source 10 may move to subsequent shot points 30 along the source line(s) SL1, and again be actuated to impart seismic energy into the subsurface. As explained elsewhere herein, the seismic energy source 10 is not limited to vehicle mounted sources, or to vibrators or drop weights; any other seismic energy sources, including without limitation, explosives may also be used in accordance with the present disclosure.

The source line SL1 may traverse one or more obstructions 32 to movement of the seismic energy source 10 (or its placement for non-vehicle sources). In the presence of obstruction(s), the source line SL1 may be broken into two or more segments, e.g., S1 and S2 on either side of each of the one or more the obstructions 32. The source line SL1 defines a first shot point at one of its ends, shown at SP1. In the case of obstruction(s) the relevant segment of the source line SL1, e.g., segment S1, will have a first shot point defined as SP1 (as is the case where there is no obstruction and the segment and source line are coterminous), and an ending shot point EP1 at or proximate to the obstruction. A length of the segment S1 is defined between the first shot point SP1 and the ending shot point EP1. In the example in FIG. 1, a second segment S2 may be defined between an opposed side of the obstruction(s) 32 having a first shot point shown at SP2, and an end shot point EP2 at or proximate the end of the source line SL1 or any subsequent obstruction along the source line SL1. If there are multiple obstructions, further segments of the source line SL1 and respective starting and end points may be defined in the same way for each such segment.

A manner of selecting the shot points 30 along the source line SL1, and as applicable any segments S1, S2 defined along the shot line SL1 according to the present disclosure will now be explained. Each seismic source line, e.g., SL1, is broken into segments associated with natural (or other) obstructions on the line if such obstructions are present; otherwise the particular source line would be considered as a single segment.

A shot point (an initial shot point such as SP1) may be defined at one end of the respective source line SL1 or each segment thereof (e.g., S1), and a nominal shot point spacing interval is established for the source line SL1. The nominal shot point spacing interval may be determined as the maximum permissible distance between regularly spaced shot points. The maximum permissible distance, and thereby the nominal shot point interval is larger than the Nyquist sampling criterion distance for regularly-spaced sampling. The Nyquist sampling criterion is at least two samples per cycle, or one half wavelength at the highest frequency to be sampled wherein the samples are equally spaced apart in the dimension of the sampling. In the present example embodiment, the Nyquist-criterion sampling distance ("Nyquist maximum spacing") is at most one half wavelength of features in the subsurface to be spatially sampled. Expressed as its inverse, Nyquist sampling requires at least two samples at the highest spatial frequency of features to be evaluated in the subsurface. Thus, according to the present disclosure, the nominal shot point spacing interval may be greater than one-half wavelength at the highest selected spatial frequency to be sampled in the subsurface. In some embodiments, the nominal shot point spacing interval may be between two and four times the Nyquist maximum sample distance, or between two and four times the quantity of one-half wavelength at the highest spatial frequency to be sampled in the subsurface. The nominal shot point spacing interval thus determined may be used as part of a calculation to define a maximum spacing between shot points along the segment (e.g., S1, S2) or the source line SL1. In addition, a minimum required distance between adjacent shot points is established. The maximum distance between shot points is then established, which in the present example embodiment may be a multiple, e.g., two to four times the nominal shot point spacing interval, less the minimum distance. For example, if the nominal shot point spacing interval is established as 50 meters, and the minimum distance is established as 2 meters, then the maximum distance between shot points is set at 98 meters (2×nominal source spacing interval less the minimum distance). The maximum distance between is then divided into a regular set of equally spaced intervals. The equally spaced intervals are generally at the discretion of the user and may be, for example 1 meter length, but could also be less than or greater than 1 meter. If the equally spaced intervals are set at 1 meter as in the example presented here, then there would be 98 possible locations for the first shot point subsequent to the first shot point, which as explained above is set at a beginning of the relevant source line SL1 or segment (e.g., S1 or S2). The actual position of the shot point subsequent to the starting point SP1 is randomly selected as an integer between 1 and the number of equally spaced intervals, in the present example, 98, and the resulting randomly selected interval is then set as the first subsequent shot point. Note that the random selection may be based on equal weighting of all possible shot point positions (a so-called "boxcar" selection), but could also be biased using various weighting schemes (such as a Gaussian distribution).

Once the first subsequent shot point is determined, the shot point location process is repeated from the first subsequent shot point to a second subsequent shot point. That is, the first subsequent shot point becomes the starting shot point for a subsequent portion of the source line SL1 or source line segment (e.g., S1), and the foregoing process of calculating a number of possible subsequent shot points from the first subsequent shot point is then repeated for each source location along the source line or segment until which time as a shot point is located at the end of the source line or the relevant segment (e.g. at EP1) or within a predetermined distance of the source line or segment end point. An example embodiment of the predetermined distance to the end point or obstruction is the minimum distance between shot points. Once shot points for the first segment S1 (or the entire source line SL1 (where no obstructions are present) are defined, a second segment, e.g., S2 may have a starting point SP2 and ending point EP2 defined and shot points along such segment calculated as explained above.

Using the foregoing method to determine shot points means that in some cases if the same small number is randomly selected in a sequence of random numbers, then a series of sequential shot points will be close together (something that cannot be obtained by dithering about locations on a regular grid unless the dithers are bigger than the nominal grid separations). Additionally, it is impossible for any two shot points to be further apart than the maximum separation selected previously, thus avoiding the need to introduce a second step to fill in large gaps; no such large gaps are generated. Finally, because the shot point separations are randomly selected with an average distance equal to the nominal distance selected for the first shot point on the source line SL1, for long sets of shot points, the number of shot points will converge to the same number as would be found if a regular distribution of shot points were selected by equally spacing them by the nominal distance.

The process of selecting the next source location continues, as previously stated along a segment until the next segment shot point range includes the end point of the segment or a nominally close position thereto. This is either the end of the source line, or where an obstruction occurs on the source line as shown in FIG. 1. At such position, the selection of the shot point is established as either the location of the end point of the source line, or the point within the allowed range which is closest to the obstruction. In the event that the last shot point is established as a closest point to an obstruction, and the line continues beyond the obstruction, the process of shot point selected is restarted for the next segment, e.g., S2, of the source line SL1, on the other side of the obstruction 32 at the closest point to the obstruction 32, such point being shown at SP2 in FIG. 1.

For sufficiently small obstructions it is within the scope of the present disclosure that the source line would be deviated around the obstruction, rather than being broken into separate segments.

Figure 2:
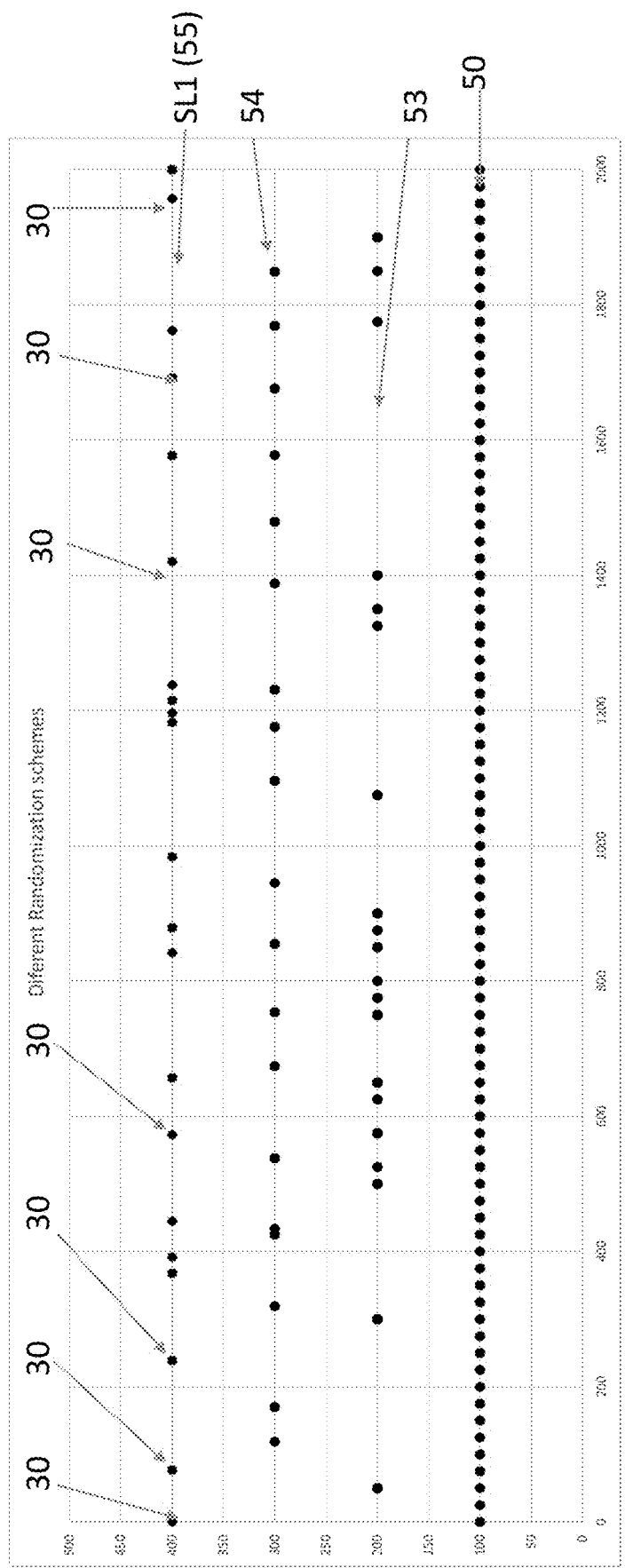
FIG. 2 shows a chart comparing various source location (shot point) arrangements, including using a method according to the present disclosure.

FIG. 2 shows a graphic comparison of shot points located by various methods with respect to shot points located according to the present disclosure. Various randomization schemes shown in FIG. 2 are based on a removal of 3 out of 4 shot points that would obtained in a regularly spaced shot point arrangement. Note that FIG. 2 illustrates relatively short sequences of shot points, so the number of shot points is different in each arrangement as shown. With longer shot point sequences, however, the number of shot points in the various location schemes will converge to be the same number. Line 50 shows shot points for a regularly spaced set of shot points on a line.

Lines 52 and 54 show randomization schemes known to be used in the placement of seismic receivers, in order to illustrate shortcomings of using such schemes for the purpose of randomizing shot points. Line 52 shows a random shot point selection based on the likelihood of any shot point being selected as being 1 in 4. from a regularly spaced scheme, e.g., shown on line 50, being randomly selected. Note the large gaps that can result between successive shot points. Line 54 shows shot points wherein every fourth shot point from line 50 is selected; each such selected shot point is then moved randomly (a random fractional amount) between zero to as much as one-half the distance between selected grid points along line 50. There can be no big gaps between shot points on line 54, but there can never be a series of closely spaced shot points.

Line SL1 (55) shows the shot points 30 generated using a method according to the present disclosure. No big gaps occur between successive shot points 30, but sequences of shot points can include several shot points 30 spaced closely together. Note that only this scheme, and the regular spacing scheme along line 50 provide shot points at the longitudinal limits of the sequence (i.e., the desired source line end points), which may be defined by obstructions.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for seismic surveying a subsurface area, comprising:
　　deploying at least a first seismic energy source at a plurality of locations along a first source line proximate the subsurface area, the plurality of locations determined by,
　　　(i) setting an initial shot point at one end of the first source line, setting a minimum distance between shot points and setting a nominal shot point interval, the nominal shot point spacing interval being greater than a Nyquist maximum spacing at a maximum spatial frequency to be evaluated in the subsurface area, (ii) calculating a maximum distance between shot points as a difference between twice the nominal shot point interval and the minimum distance, (iii) dividing a span between the maximum distance and the minimum distance into a selected number of equally spaced samples, and choosing at random one of the equally spaced samples to calculate a shot point subsequent to the initial shot point; and (iv) setting the calculated shot point as the initial shot point and repeating (ii) and (iii) until the subsequent calculated shot point is within a predetermined distance of an opposed end of the first source line;

deploying a plurality of seismic receivers at selected receiver positions proximate the subsurface area;

at selected times, actuating the at least a first seismic energy source; and detecting seismic signals in response to energy imparted into the subsurface area by the at least a first seismic energy source using the plurality of receivers.

2. The method of claim 1 wherein the first source line is separated into at least a first segment and a second segment interrupted by an obstruction along the first source line, and wherein the plurality of locations on the second segment are determined by (v) setting an initial shot point at one end of the second segment, setting a minimum distance between shot points and setting a nominal shot point spacing interval being greater than a Nyquist maximum spacing at a maximum spatial frequency to be evaluated in the subsurface area, (vi) calculating a maximum distance between shot points as a difference between twice the nominal shot point interval and the minimum distance, (vii) dividing a span between the maximum distance and the minimum distance into a selected number of equally spaced samples, and choosing at random one of the equally spaced samples to calculate a shot point subsequent to the initial shot point; and (viii) setting the calculated shot point as the initial shot point and repeating (vi) and (vii) until the subsequent calculated shot point is within a predetermined distance of an opposed end of the second segment.

3. The method of claim 1 wherein the selected receiver positions are disposed along at least one receiver line.

4. The method of claim 1 wherein the plurality of seismic receivers comprises nodal sensors connected wirelessly to a recording system.

5. The method of claim 1 further comprising:

deploying at least a second seismic energy source at a plurality of locations along a second source line proximate the first source line, the plurality of locations along the second line determined by, (ix) setting an initial shot point at one end of the second source line, setting a minimum distance between shot points and setting a nominal shot point spacing interval being greater than a Nyquist maximum spacing at a maximum spatial frequency to be evaluated in the subsurface area, (x) calculating a maximum distance between shot points as a difference between twice the nominal shot point interval and the minimum distance, (xi) dividing a span between the maximum distance and the minimum distance into a selected number of equally spaced samples, and choosing at random one of the equally spaced samples to calculate a shot point subsequent to the initial shot point; and (xii) setting the calculated shot point as the initial shot point and repeating (xi) and (xii) until the subsequent calculated shot point is within a predetermined distance of an opposed end of the second source line;

actuating the at least a second seismic energy source; and detecting seismic signals in response to energy imparted into the subsurface area by the at least a second seismic energy source using the plurality of receivers.

6. The method of claim 5 wherein the first seismic energy source and the second seismic energy source are operated such that the detected seismic signals comprise energy from the first seismic energy source and the second seismic energy source.

7. The method of claim 6 further comprising deblending the detected seismic signals into records comprising energy from only one of the first seismic energy source or the second seismic energy source.

8. The method of claim 7 wherein the selected receiver positions are disposed along at least one receiver line.

9. The method of claim 8 wherein the at least one receiver line is parallel to the first source line, and the second source line is parallel to the first source line.

10. The method of claim 5 wherein the at least a second seismic energy source comprises a seismic vibrator.

11. The method of claim 5 wherein the at least one receiver line is perpendicular to the first source line, and the second source line is parallel to the first source line.

12. The method of claim 1 wherein the at least a first seismic energy source comprises a seismic vibrator.

13. The method of claim 1 wherein the nominal shot point interval is at least twice a value of one half wavelength at the highest spatial frequency.

14. The method of claim 12 wherein the nominal shot point interval is between two and four times the value of one half wavelength at the highest spatial frequency.

* * * * *